United States Patent
Pedersen

(10) Patent No.: US 7,159,449 B2
(45) Date of Patent: Jan. 9, 2007

(54) METHOD OF DETECTING LEAKAGE IN A HEAT EXCHANGER

(75) Inventor: Eigil Appel Pedersen, Silkeborg (DK)

(73) Assignee: Bactoforce International A/S, Silkeborg (DK)

( * ) Notice: Subject to any disclaimer, the term of this patent is extended or adjusted under 35 U.S.C. 154(b) by 0 days.

(21) Appl. No.: 10/527,563

(22) PCT Filed: Sep. 11, 2003

(86) PCT No.: PCT/DK03/00589

§ 371 (c)(1),
(2), (4) Date: Mar. 11, 2005

(87) PCT Pub. No.: WO2004/025240

PCT Pub. Date: Mar. 25, 2004

(65) Prior Publication Data

US 2005/0235737 A1    Oct. 27, 2005

(30) Foreign Application Priority Data

Sep. 11, 2002   (DK)  ............................ 2002 01335

(51) Int. Cl.
*G01M 3/04*     (2006.01)

(52) U.S. Cl. ...................................................... 73/40.7
(58) Field of Classification Search ................... 73/40, 73/40.5 R, 40.7; 165/11.1
See application file for complete search history.

(56) References Cited

U.S. PATENT DOCUMENTS 3,762,212 A * 10/1973 Morley et al. ............... 73/40.7
4,688,627 A *  8/1987 Jean-Luc et al. ........... 165/11.1
6,286,362 B1 *  9/2001 Coffman et al. ............. 73/40.7

* cited by examiner

*Primary Examiner*—Charles Garber
(74) *Attorney, Agent, or Firm*—Donald S. Dowden; Cooper & Dunham LLP

(57) ABSTRACT

A method is provided for detecting leakage in a heat exchanger by circulating a tracer under pressure from the first side of said heat exchanger to the second side and then from the second side to the first side subsequent to reversing the direction of the pressure. In order to prevent a false test result it has previously been necessary to make sure that all tracers, for example electrolytes, colorants, or fluorofors, were rinsed from the first side prior to circulating the tracers from the second side to the first side. This time consuming and at the same time unreliable rinsing process is avoided by the method of the present invention by adding a second tracer from the second side.

3 Claims, No Drawings

METHOD OF DETECTING LEAKAGE IN A HEAT EXCHANGER

TECHNICAL FIELD

The present invention relates to a method according to the preamble of claim 1.

BACKGROUND ART

It is known to detect leakage in a heat exchanger by subjecting the first or the second side of said heat exchanger to pressure followed by a measuring of whether a loss of pressure occurs. However, this method is not reliable as the heat exchanger may have such a small hole that it can maintain the pressure for such a long period of time that it creates a false sense of security.

It is also known under pressure to circulate a liquid admixed an electrolyte on the first side of the heat exchanger, referred to as the donor face, and without pressure to circulate a second liquid on the second side of said heat exchanger, referred to as the recipient face. During the test, it is measured whether the conductance increases on the recipient face as a result of a leakage of donor liquid with electrolyte into the recipient liquid.

It is also known to use the same principle as described above, where the tracer is a colorant or a fluorescent substance, referred to as a fluorofor, instead of being an electrolyte.

The plates in a heat exchanger are pressed into a wave pattern so as both to enlarge the surface of the plates and to cause a turbulence in the liquid flow passing through the heat exchanger. Due to the wavy pattern of the plates, said plates rest on each other in the assembled state of the heat exchanger.

When the donor face is subjected to pressure, which results in a differential pressure, the crests of the wavy patterns are pressed against each other. As a result, a possible leakage located at the crest of the wave pattern is not detected as the compression of the plates presses said plates upwards against each other, thereby closing the leakage, which is not detected accordingly.

In order to solve this problem, many have chosen to pressure test the heat exchanger from both sides. However, such a solution causes a problem when tracers are used. It is necessary to make sure that such tracers, for example electrolytes, colorants or fluorofors, are rinsed completely from the original donor face to prevent a false reaction and consequently a false test result.

DISCLOSURE OF INVENTION

The object of the present invention is to provide a method of the type mentioned above so as to avoid the laborious rinsing of tracers which also causes unreliable measuring results.

The object of the invention is obtained by a further development of the method of the type mentioned above and as stated in the characterising part of claim 1.

When the first tracer according to the preamble of claim 1 is detectable on the recipient face, then the test is completed, per se, with the detection of a leakage.

When the first tracer according to the preamble of claim 1 is not detectable on the recipient face, the heat exchanger can be pressure tested from the side which was previously the recipient face without necessitating a rinsing out of the first tracer. As a result, it is only necessary to measure whether the second tracer is detectable on the new recipient face. i.e. the original donor face.

Claim 2 deals with examples of possible tracers. It is merely important that the tracer used at the pressure test of the heat exchanger from the second side differs from the tracer used at the pressure test of the heat exchanger from the first side.

The invention claimed is:

1. A method of detecting leakage comprising the steps of providing a heat exchanger, circulating under pressure a liquid admixed with a first tracer on a first side of said heat exchanger, referred to as a first donor face, circulating a second liquid under no pressure or under a lower pressure on the second side of said first heat exchanger, referred to as a first recipient face, measuring whether said first tracer is detectable on said first recipient face, adding a second tracer to the second liquid on the second side of the heat exchanger in case the first tracer was undetectable on the first recipient face, reversing the pressure to make said first recipient face a new donor face and the first donor face a new recipient face, and determining whether said second tracer is detectable on said new recipient face.

2. A method according to claim 1, wherein the first tracer comprises an electrolyte, one of two different colorants or one or two different fluorescent substances, and the second tracer comprises one of the former five tracers differing from the first tracer.

3. A method according to claim 1 comprising providing a plate heat exchanger as said heat exchanger.

* * * * *